United States Patent
Ibrahim et al.

(10) Patent No.: US 10,971,018 B2
(45) Date of Patent: Apr. 6, 2021

(54) VEHICULAR PLATOON SUBSCRIPTION AND MANAGEMENT SYSTEM

(71) Applicant: Ford Global Technologies, LLC, Dearborn, MI (US)

(72) Inventors: Umair Ibrahim, San Jose, CA (US); Ian Fleming, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 16/205,979

(22) Filed: Nov. 30, 2018

(65) Prior Publication Data
US 2020/0175880 A1 Jun. 4, 2020

(51) Int. Cl.
| | | |
|---|---|---|
| G08G 1/01 | (2006.01) | |
| B60W 40/09 | (2012.01) | |
| G08G 1/00 | (2006.01) | |
| H04L 29/08 | (2006.01) | |

(52) U.S. Cl.
CPC ............... *G08G 1/22* (2013.01); *B60W 40/09* (2013.01); *G08G 1/0129* (2013.01); *G08G 1/0137* (2013.01); *H04L 67/306* (2013.01)

(58) Field of Classification Search
CPC .. G08G 1/00; G08G 1/01; G08G 1/22; G08G 1/0137; B60W 40/09; B60W 2050/008; H04L 29/08; H04L 67/306
See application file for complete search history.

(56) References Cited

U.S. PATENT DOCUMENTS

| | | | | |
|---|---|---|---|---|
| 9,940,840 B1* | 4/2018 | Schubert | ............ | G01C 21/3407 |
| 9,953,245 B2 | 4/2018 | Palacio et al. | | |
| 10,459,454 B2* | 10/2019 | Saxena | ................ | G05D 1/0291 |
| 10,474,166 B2* | 11/2019 | Switkes | ............... | G05D 1/0293 |
| 10,482,767 B2* | 11/2019 | Miller, Jr. | ........... | B60W 30/165 |
| 10,520,952 B1* | 12/2019 | Luckevich | ............. | B60W 10/18 |
| 10,698,421 B1* | 6/2020 | Harris | .................. | G05D 1/0289 |
| 2003/0182183 A1 | 9/2003 | Pribe | | |
| 2017/0227972 A1* | 8/2017 | Sabau | .................... | G05D 1/024 |
| 2017/0293296 A1* | 10/2017 | Stenneth | ................ | G06Q 20/10 |

OTHER PUBLICATIONS

Platoonconnect, Platoon Service Provider Platform, www.platoonconnect.com, 7 pages.

* cited by examiner

*Primary Examiner* — Tan Q Nguyen
(74) *Attorney, Agent, or Firm* — Gregory P. Brown; Brooks Kushman, P.C.

(57) ABSTRACT

A vehicle platoon system may include a database configured to maintain a user profile and data descriptive of existing platoons, and a processor configured to receive a platoon request indicating desire to join a platoon, receive, in response to the request, the user profile defining at least one compliance threshold indicative of a minimum compliance score of other platoon participants, determine whether all members of at least one of the existing platoons have a compliance score exceeding the compliance threshold, and instruct an indication of the platoon to be presented for selection.

18 Claims, 4 Drawing Sheets

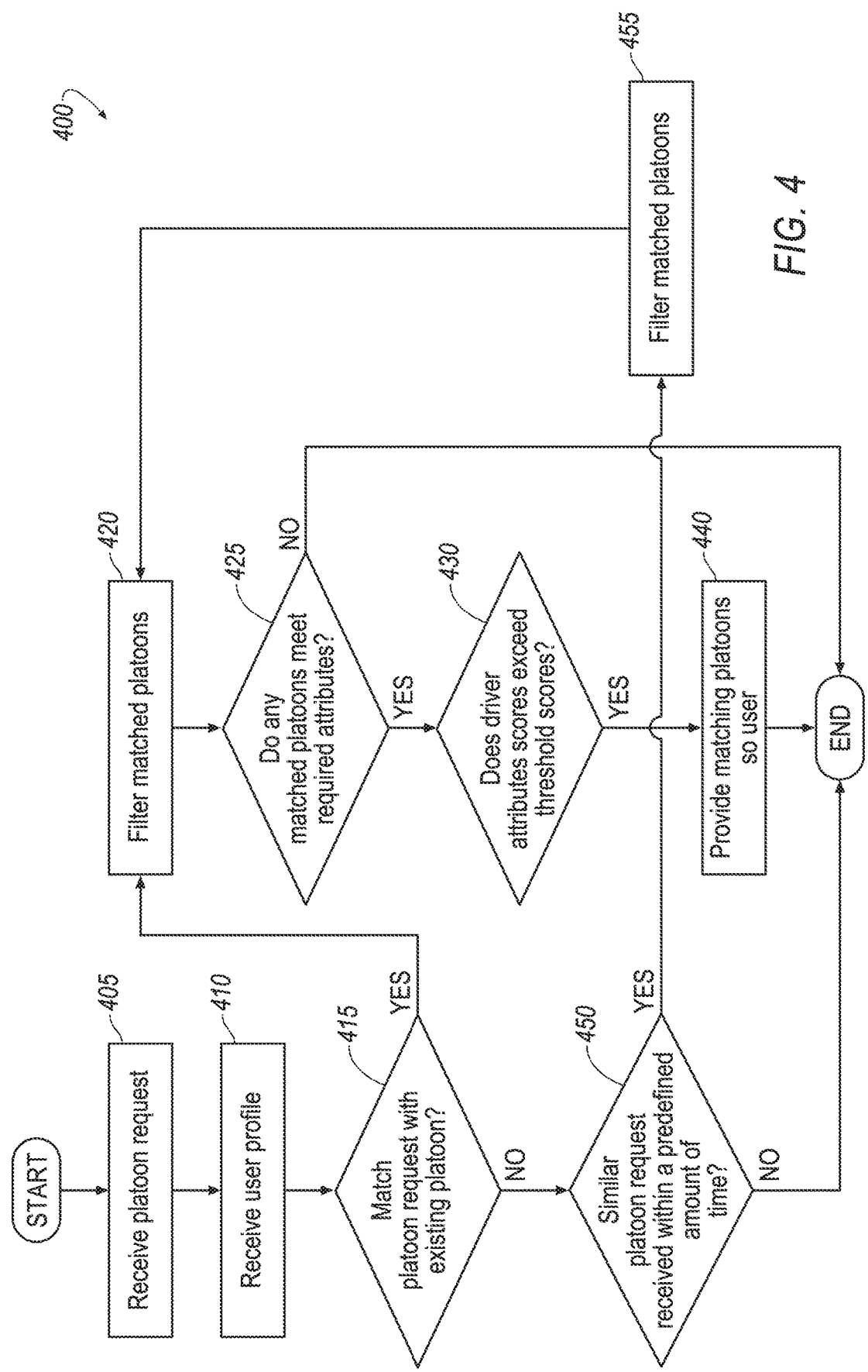

VEHICULAR PLATOON SUBSCRIPTION AND MANAGEMENT SYSTEM

TECHNICAL FIELD

Aspects of the disclosure generally relate to vehicle platoon subscription and management systems.

BACKGROUND

Vehicle platooning may allow for improved battery life and fuel efficiencies, reduced congested, traffic synchronization, etc. As vehicle platooning becomes more and more popular, more and more users will look to platooning as part of their transportation options. However, often time platooning is highly dependent on user participation and compliance.

SUMMARY

A vehicle platoon system may include a database configured to maintain a user profile and data descriptive of existing platoons, and a processor configured to receive a platoon request indicating desire to join a platoon, receive, in response to the request, the user profile defining at least one compliance threshold indicative of a minimum compliance score of other platoon participants, determine whether all members of at least one of the existing platoons have a compliance score exceeding the compliance threshold, and instruct an indication of the platoon to be presented for selection.

A vehicle platoon system may include a database configured to maintain a user profile defining required platoon attributes and existing platoons and a processor configured to match at least one of the existing platoons based on a platoon request, determine which of the matched existing platoons meet the required platoon attributes defined by the user profile, and instruct the filtered platoons to be presented for user selection.

A vehicle platoon system may include a database configured to maintain a user profile of a user defining required platoon attributes and existing platoons and a processor configured to receive a platoon request indicating a desire of the user to join a platoon, determine whether one of the existing platoons matches the platoon request based on at least start and end locations defined by the request, filter the matched existing platoons based on the required platoon attributes defined by the user profile, and instruct the filtered platoons to be presented for user selection.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 4 illustrates a process of the platoon system.

DETAILED DESCRIPTION

Figure 1:
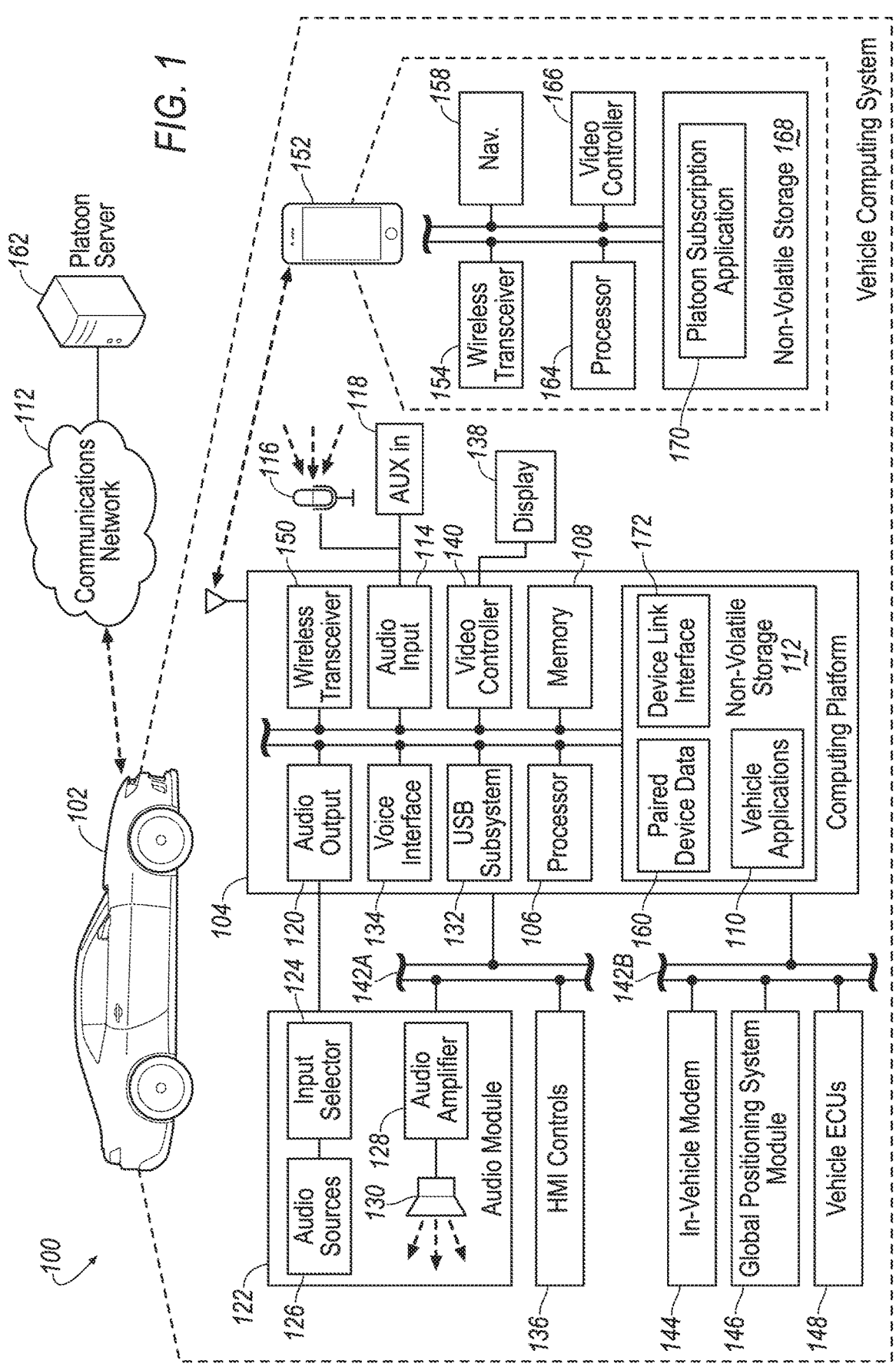
FIG. 1 illustrates an example diagram including a vehicle configured to access telematics servers and a mobile device having a platoon subscription application.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle platoon may include a group or fleet of vehicles, one following another, that can travel very closely together at higher speeds than traditional traffic could on similar routes. This is in part because each vehicle has a similar destination and communicates with the other vehicles in the platoon. The platoon may include a lead vehicle that controls the speed and direction. The following vehicles (which have precisely matched braking and acceleration) respond to the lead vehicle's movement.

Vehicle platooning, or convoying, may allow for higher speeds, less breaking, reduced congestion, improved estimated times of arrival (ETA) and miles per gallon (MPG), traffic synchronization, fuel efficiency due the reduced draft, higher road capacity, higher safety and less driver fatigue.

However, existing platoons require identifying drivers with common destination goals, which may be problematic where the drivers are not known to each other and the destinations of potential vehicles are changing frequently. Further, identifying vehicles with the appropriate capabilities that would be suitable for platoon formation and on-going platooning communication is a concern, given the variation in vehicle capabilities and control signals.

Existing platoon systems may not realize that contacting and coordinating drivers to facilitate strategic (ad-hoc) platoon formation, even for as few as two vehicles, could be helpful for getting across a busy city, as well as for longer highway stretches. Further, understanding road conditions of strategic common routes that make platooning strategies advantageous to candidate vehicles, including suitable lane markings, areas of congestion, etc.

Furthermore, candidate drivers want to be assured that the platoon is valid and efficient. The efficiencies and consistency of a platoon may decrease as other participants fail to comply with the rules, and/or drop out of the platoon. Thus, allowing a user to set a minimum compliance score for the other participants may increase platoon efficiencies. Also, requiring other desired platoon characteristics, such as optimization criteria (MPG (miles per gallon), safety, etc.), driver's willingness to lead the platoon, minimum and maximum number of vehicles of the platoon, etc. may also increase driver satisfaction with platooning and thus encourage more participation.

Disclosed herein in a platoon optimization system configured to encourage participation and compliance by the driver with platoon regulations, including driving characteristics, as well as consistent participation. Drivers may enter user preferences for their platoon which may include certain compliance scores of the other drivers in the platoon, certain vehicle features that increase the efficiency of the platoon, MPG, ETC, number of vehicles, position in the platoon, preferred platoon configuration, etc. The system may then match a platoon request for a specific destination with existing platoon opportunities that meet the user preferences. Furthermore, the system may create ad-hoc platoons based on multiple and similar platoon requests.

FIG. 1 illustrates an example system 100 including a vehicle 102 configured to access telematics servers and a mobile device 152. The vehicle 102 may include various types of passenger vehicles, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the vehicle 102 may include the SYNC system manufactured by The Ford Motor Company of Dearborn, Mich. It should be noted that the illustrated system 100 is merely an example, and more, fewer, and/or differently located elements may be used.

The computing platform 104 may include a memory 108 and one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM), frequency modulated (FM) or satellite digital audio radio service (SDARS) signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media-oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to incorporate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, wearable devices, E-textiles or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132. In some examples the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention. In some vehicles 102, the computing platform 104 wireless transceiver 154 may be configured to provide hotspot functionality to user's mobile devices 152.

When a mobile device 152 that supports network connectivity is paired with the computing platform 104, the mobile device 152 may allow the computing platform 104 to use the network connectivity of the device modem 158 to communicate over the communications network 156 with the remote telematics server or platoon server 162 or other remote computing device. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications loaded to a memory 166 of the mobile device 152 from storage medium 168 of the mobile device 152. In some examples, the mobile applications may be configured to communicate with the computing platform 104 via the wireless transceiver 154 and with the server 162 or other network services via the device modem 158. The computing platform 104 may also include a device link interface 172 to facilitate the integration of functionality of the mobile applications into the grammar of commands available via the voice interface 134. The device link interface 172 may also provide the mobile applications with access to vehicle information available to the computing platform 104 via the in-vehicle networks 142. An example of a device link interface 172 may be the SYNC APPLINK component of the SYNC system provided by The Ford Motor Company of Dearborn, Mich.

A platoon subscription application 170 may be an example of an application installed to the mobile device 152 and configured to utilize the device link interface 172 to interact with the computing platform 104. When connected to the vehicle 102, the platoon subscription application 170 may be configured to utilize information from vehicle sensors, actuators and electronic control units made available via the vehicle bus 142. The platoon subscription application 170 may also be configured to operate when untethered from the vehicle 102, such as when the user is not within the vehicle. The platoon subscription application 170 may be further configured to communicate with servers via the communications network 156, as discussed in detail below. The user may interact with the platoon subscription application 170 through the HMI of the mobile device 152, via a web interface, or via the HMI of the vehicle 102, to avoid distraction while driving. The platoon subscription application 170 may be installed within the vehicle, or via a user's personal computer and accessible via a web interface.

The platoon subscription application 170 may communicate specifically with the platoon server 162 to organize platoons based on driver requests, driver preferences and profiles, traffic and map information, and other vehicle and driver information. The platoon server 162 may include a processor and be configured to receive and respond to platoon requests from the driver. The server 162 may include or be in communication with a database configured to maintain platoon profiles, user profiles, etc.

Figure 2:
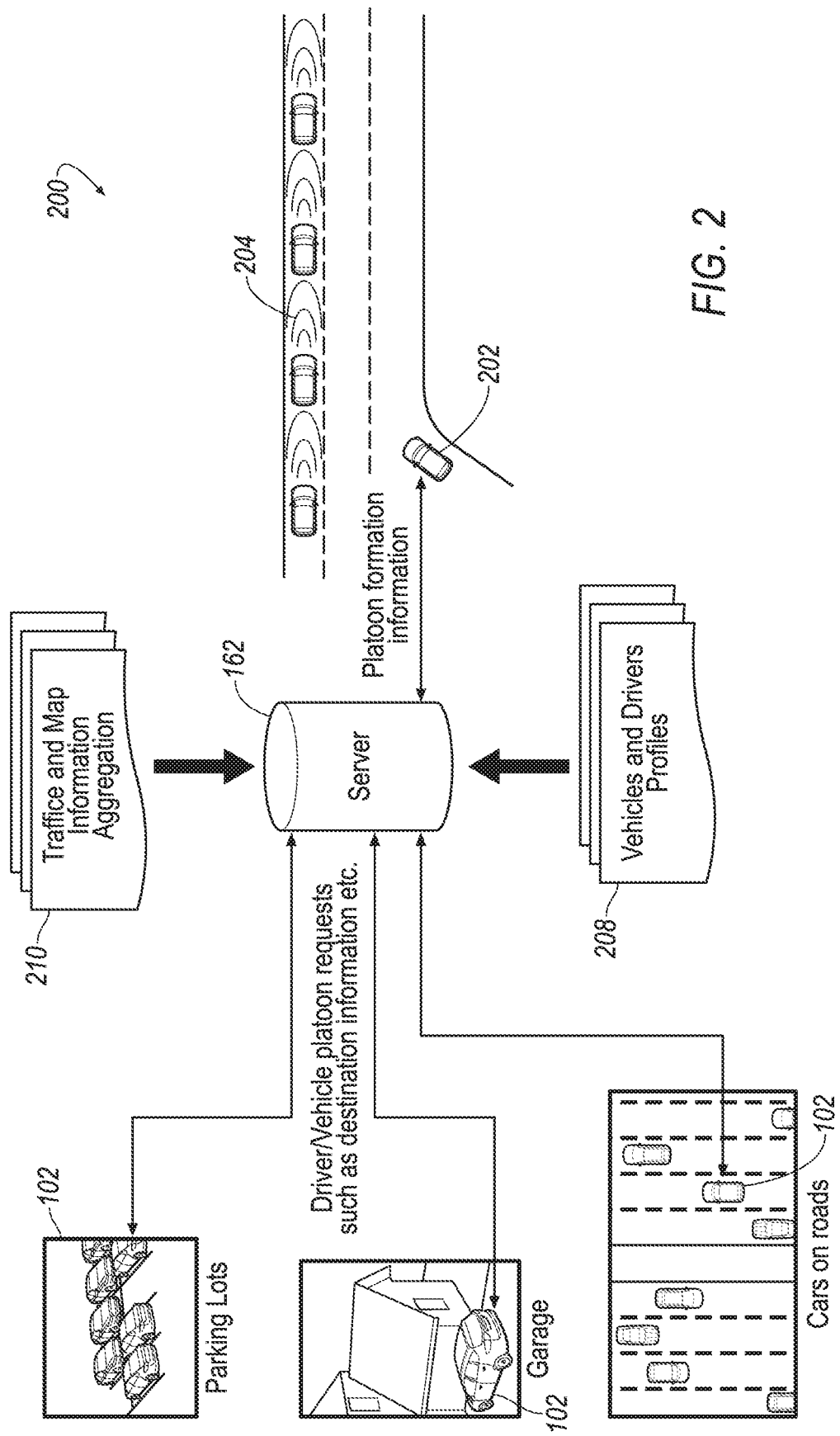
FIG. 2 illustrates an example platoon subscription system.

FIG. 2 illustrates an example platoon subscription system 200 carried out by the platoon server 162. The platoon subscription system 200 may include various vehicles 102. These vehicles 102 may be stationed and arranged in parking lots, garages, etc. These vehicles 102 may also be currently traveling on a road. These vehicles 102 may be configured to create or join a platoon 204. A platoon 204 may be a group of vehicles that can travel very closely together, safely at high speeds. Each vehicle 102 may communicate with the others via V2V communication or other protocols. The vehicles may be succinctly controlled so as to maintain constant speeds, similar braking patterns, etc. communicates with the other vehicles in the platoon. The platoon 204 may include a lead vehicle that controls the speed and direction, and all following vehicles may respond to the lead vehicle's movement. The platoon allows for an efficient travel mechanism that may increase energy efficiencies, traffic flow, etc.

The platoon 204 may include platoon information such as a platoon start location, platoon start time, platoon end location, number of participants and various vehicle positions within the platoon.

A user 202 may wish to join a platoon. The user 202 may make a platoon request indicating platoon request data such as a route start location, a route start time, and a route end location. The platoon server 162 may include or be in communication with a one or more database, including, for example, a profile database 208 and a map database 210.

The profile database 208 may include driver and vehicle profiles both for the user 202, as well as other drivers subscribing to the platoon service. The map database 210 may include map information used to collate routes, as well as traffic, construction, and other route related information. The server 162 may receive the platoon request and attempt to match the request with an existing platoon, or collate multiple platoon requests to form a platoon.

If the server 162 matches the platoon request with a platoon, the server 162 may filter the matched platoons based on platoon requirements established via the user profile. That is, matched platoons that do not meet certain required attributes as established by the user may be removed from the possible list of platoons. The user 202 may be notified via the user interface of the vehicle 102, mobile device 152, computer, etc. The server 162 may transmit platoon information to the user's vehicle 102 and instruct the vehicle accordingly.

Figure 3:
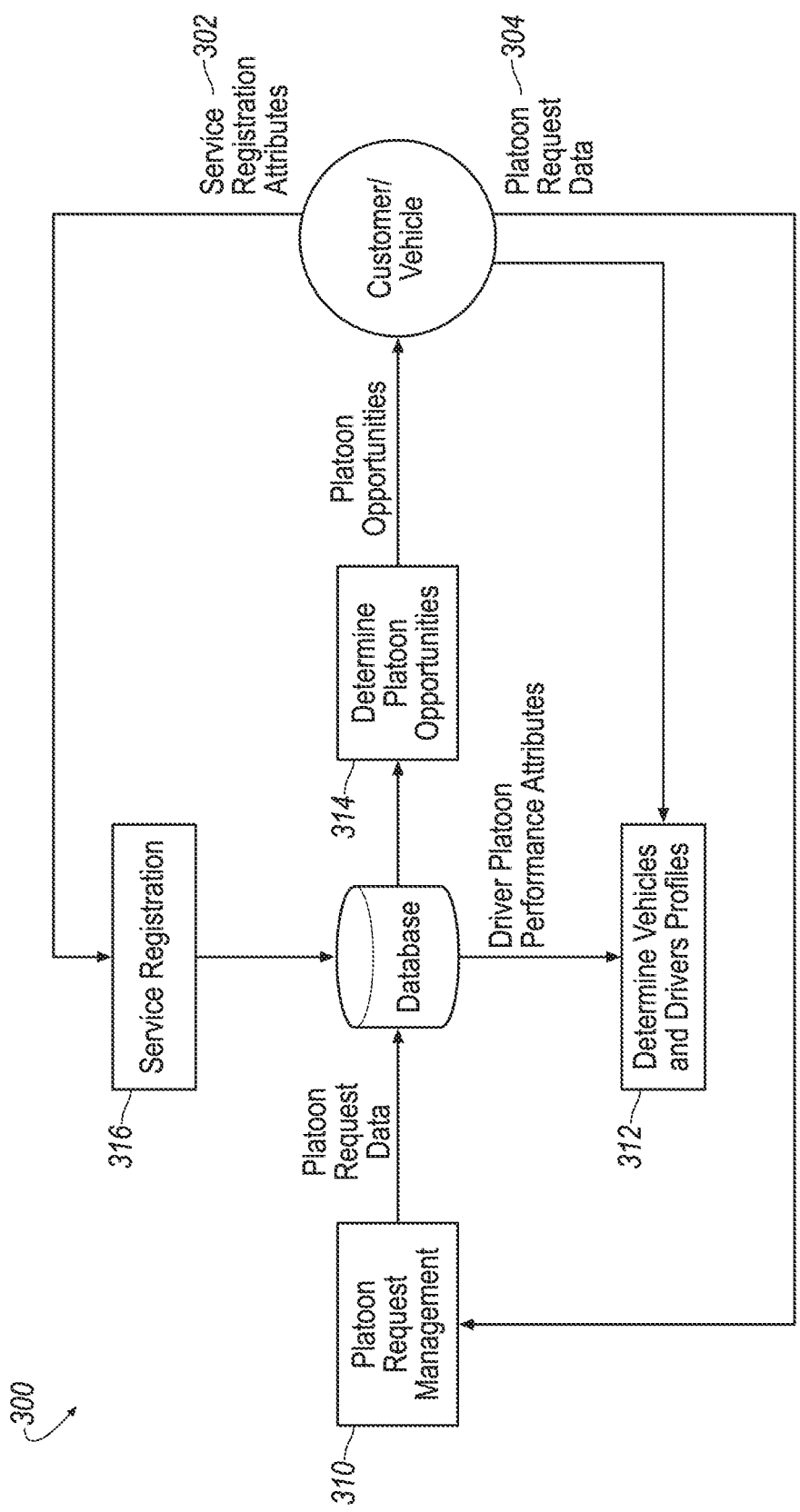
FIG. 3 illustrates an example flow chart of the platoon system.

FIG. 3 illustrates an example flow chart 300 of the platoon system 200. The user 202 and his or her vehicle 102 may be associated with a user registration 302. The user registration 302 may include a user profile including vehicle attributes related to the specific user and his or her vehicle. These attributes may include vehicle features and capabilities including various autonomous vehicle features. These features may include autonomous cruise control (ACC) with stop-and-go, as well as other driver assistance technologies. The user registration 302 may be stored in the profile database 208. The user registration 302 may be updated when a user purchases a new vehicle or is driving another vehicle.

The user registration may include user preferences or required platoon attributes that are pre-set by the user and not necessary to include in the platoon request each time. These preferences may be modifiable at any time via the user interface, but may also be saved and stored for future platoon requests in order to avoid re-entry of the user preferences for each request.

As explained above, the platoon request 304 may include platoon request data such a route start location, route start time, route end time, etc. The user 202 may make these data inputs via the interface either on the mobile device 152 or the vehicle HMI 136. At block 310, the server 162 may verify that the user 202 has entered all information necessary to make a possible platoon match. The server 162 may instruct the user interface to alert the user or request more information should the correct data not have been entered.

The user registration may include user preferences that are pre-set by the user and not necessary to include in the platoon request each time. The user preferences or required attributes may include preferences as to features or the platoon or platoon members. For example, the user may select a minimum fellow participant rating. This may be the required rating band for other vehicles that are willing to participate in the platoon. The ratings of the fellow participants may be objectively determined via the participant's driving behaviors offline or in real-time based on trip histories of the other participant.

The user preferences may also include preferences in platoon positioning. That is, does the user prefer to be towards the front or back of the platoon. The size and range of the platoon may also be selected. This may include a maximum or minimum number of vehicles in a single platoon that the registrant is willing to participant with. Other desired parameters such as MPG, ETA, safety ratings, optimization, etc., may also be selected by the user. The number or hops per trip, such as the number of platoons that the registrant is willing to participate in may be specified. Vehicle features may also be mandated, such as certain ADAS features, cooperate ACC, CMbB, FCW, etc.

The user preferences may include a minimum length of the platoon, or a minimum participation amount (e.g., that the user participate in the platoon). The user preferences may include a minimum distance from the estimation, the amount of time the user is willing to delay a trip in order to join a platoon, etc.

Each user 202 may be associated with certain driver attributes 306. These driver attributes may be performance-based attributes of each user 202. Driver's may be rated on their commitment to the platoon, as well as their compliance once in a platoon. The driver attributes 306 may be continually updated based on the user's behavior. Such attributes may include a user's 202 behavior with respect to previously subscribed to platoons and may include a commitment attribute and a compliance attribute. In order for platoons to be effective, a certain number of drivers are required. When a driver subscribes to a platoon, but then drops out either before the start, or mid-way through the route, the efficiency of the platoon is affected. Thus, it is important to encourage drivers to maintain the platoon by not dropping out.

The commitment attribute may include a score that is decreased if a driver drops from the platoon. The score may be decreased by a higher amount if the driver drops once the platoon has been initiated rather than if the driver drops in advance of the platoon beginning. In some examples, the driver must maintain a minimum level of commitment. For example, if the commitment attribute is a score between 1 and 10, then a threshold minimum commitment may be a score of 8. That is, the driver may not be permitted to commit to a platoon if the driver's commitment attribute is below the threshold commitment. By maintaining a commitment attribute, the driver is encouraged to commit and participate in platoons, decreasing the drop out rate and increasing the effectiveness of the platoon.

Platoons also require compliance by the included drivers. Once a vehicle has joined a platoon, if the vehicle slows unnecessarily or fails to maintain the appropriate distance, the goal of the platoon may be adverted due to one driver's lack of compliance. The compliance attribute may have a score decrease each time the driver falls out of compliance with the platoon. The score may increase with each platoon subscription where the driver did not fall out of compliance. In some examples, the driver must maintain a minimum level of compliance. For example, if the compliance attribute is a score between 1 and 10, then a threshold minimum compliance may be a score of 8. That is, the driver may not be permitted to subscribe to a platoon if the driver's compliance attribute is below the threshold commitment. By maintaining a compliance attribute, the driver is encouraged to comply with platoon rules and regulation, decreasing the amount of non-compliance for platoons and increasing the effectiveness of the platoon.

The user's platoon score may be used, in addition to a requirement for joining platoons, to incentivize the user to comply with platoons by providing certain perks to the user in response to platoon compliance. These perks may include monetary perks, rewards or gifts for compliance, etc.

At block 312 the server 162 may look-up the driver attributes maintained in the profile database 208.

At block 316, the server 162 may look-up the user registration including the user preferences and vehicle information.

At block 314, the server 162 may look up possible platoon opportunities to determine if the server 162 may create a platoon match with the platoon request. The platoon opportunities may include a list of existing platoons. The existing platoons may include platoon data, such as the platoon start location, platoon start time, platoon end location, number of platoon participants, and the location of the next vehicle in the platoon.

The server 162 may then attempt to match the platoon request with an existing platoon based on various heuristics, algorithms, and decision matrixes in order to find a platoon with a high degree of match, while still within the bounds of the user preferences. For example, the server 162 may search for all existing platoons that meet a minimum number of platoon members as defined by the driver profile.

Additionally or alternatively, the server 162 may match certain platoon requests that are received within a predefined amount of time to create a new platoon. For example, if a predefined number of users request a platoon for a specific end location, within approximately an hour of each other, then the server 162 may generate a new platoon.

The server 162 may, upon receiving the platoon request, may find the optimal route for the user based on the route state location and route end location. The server 162 may compare this route to the routes of existing platoons and identify the overlapping section of all the trips. The server 162 may then filter these overlapping sections based on platoon data and platoon requirements such as driver history, vehicle capabilities, and user preferences. The server 162 may then output the possible platoon opportunities to the user via the user interface.

FIG. 4 illustrates an example process 400 of the platoon system 200 as carried about by the platoon server 162. The process 400 begins at block 405 where the server 162 may receive a platoon request from a driver. The platoon request may include the route start location, route start time, and route end location. The platoon request may also identify the driver.

At block 410, the server 162 may receive the user profile associated with the driver. The user profile may include user registration data such as the user preferences as well as vehicle attributes. The user preferences, as explained above, may include user defined options regarding possible platoon characteristics. The vehicle attributes may include vehicle features that are often used during platooning. The user profile may also include dynamic and continuously updated data such as the compliance and commitment scores.

At block 415, the server may, based on the platoon request, determine whether an existing platoon matches the platoon request. That is, is there a platoon, or more than one platoon, with similar overlapping routes. If so, the process 400 proceeds to block 420. If not, the process proceeds to block 450.

At block 420, the server 162 may filter the matched platoon by applying the user preferences. As explained above, the user preferences/required attributes may include certain restrictions or preferences that the platoon must meet in order for the user to desire to be part of the platoon. In one example, the platoon may be a certain size, or only require a maximum amount of "hops." Once the matched platoons are filtered based on the user preferences defined in the user profile, the process 400 proceeds to block 425.

At block 425, the server 162 determines whether any matched platoons are still available to the user after the filtering. If so, the process 400 proceeds to block 430. If not, the process 400 ends.

At block 430, the server 162 may determine whether the driver's attribute scores, including the compliance and commitment scores, meet a minimum threshold score for each. That is, is the user's compliance score above the predefined compliance threshold and is the user's commitment score above the predefined commitment threshold. If so, the process 400 proceeds to block 440. If not, the process proceeds to block 405.

At block 440, the server 162 may instruct the user interface to provide the matching platoon or platoons to the user. The user may select to be part of one of the presented platoons. The process 400 may then end.

At block 450, the server 162 may determine whether other users have submitted similar platoon requests. This may allow a new platoon to form based on similarly received requests. If a predetermined number of requests have been received within a predefined amount of time, the process 400 may proceed to block 455.

At block 455, the server 162 may form a new platoon based on the collective requests. The process 400 may then proceed to block 420.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle platoon system, comprising:
a database configured to maintain a user profile and data descriptive of existing platoons, wherein the user profile includes a driver compliance score indicative of historical compliance with platoon rules;
a processor configured to
receive a platoon request indicating desire to join a platoon;
receive, in response to the request, the user profile defining at least one compliance threshold indicative of a minimum compliance score of other platoon participants;
determine whether all members of at least one of the existing platoons have a compliance score exceeding the compliance threshold; and
instruct an indication of the platoon to be presented for selection.

2. The system of claim 1, wherein the database defines a platoon compliance threshold defining a minimum driver compliance score, and the processor is configured to determine whether a driver compliance score of the driver defined by the user profile is above the minimum driver compliance score.

3. The system of claim 1, wherein the driver compliance score decreases in response to a violation of a platoon rule.

4. The system of claim 1, wherein the user profile includes a driver compliance score indicative of the driver's historical commitment to platoons.

5. The system of claim 4, wherein the database defines a platoon commitment threshold indicating a minimum driver commitment score necessary to join the existing platoon, and the processor is configured to determine whether a driver compliance score of the driver defined by the user profile exceeds the minimum driver compliance score.

6. The system of claim 5, wherein the driver commitment score decreases in response to the driver dropping out of a platoon.

7. The system of claim 1, wherein the user profile defines at least one vehicle attribute defining at least one vehicle required to join the at least one of the existing platoons.

8. A vehicle platoon system, comprising:
a database configured to maintain a user profile defining required platoon attributes and existing platoons, wherein the user profile includes a driver compliance score indicative of historical compliance with platoon rules and wherein the driver compliance score decreases in response to a violation of a platoon rule;
a processor configured to
match at least one of the existing platoons based on a platoon request;
determine which of the matched existing platoons meet the required platoon attributes defined by the user profile; and
instruct the filtered platoons to be presented for user selection.

9. The system of claim 8, wherein the required platoon attributes include at least one minimum compliance score of other platoon participants.

10. The system of claim 8, wherein the required platoon attributes include a minimum driver commitment score of other platoon participants.

11. The system of claim 8, wherein the required platoon attributes include a maximum number of platoon hops.

12. The system of claim 8, wherein the required platoon attributes include a maximum number of platoon participants.

13. The system of claim 8, wherein the required platoon attributes include a preferred platoon position.

14. A vehicle platoon system, comprising:
a database configured to maintain a user profile of a user defining required platoon attributes and existing platoons and including a driver compliance score indicative of the driver's historical commitment to platoons, wherein the database defines a platoon commitment threshold for the existing platoons indicating a minimum driver commitment score necessary to join the existing platoons;
a processor configured to
receive a platoon request indicating a desire of the user to join a platoon;
determine whether one of the existing platoons matches the platoon request based on at least start and end locations defined by the request;
filter the matched existing platoons based on the required platoon attributes defined by the user profile;
determine whether the driver compliance score exceeds the minimum driver compliance score of the matched existing platoons; and
instruct the filtered platoons to be presented for user selection.

15. The system of claim 14, wherein the required platoon attributes include at least one minimum compliance score of other platoon participants.

16. The system of claim 14, wherein the required platoon attributes include a minimum driver commitment score of other platoon participants.

17. The system of claim 14, wherein the required platoon attributes include a maximum number of platoon hops.

18. The system of claim 14, wherein the required platoon attributes include a maximum number of platoon participants.

* * * * *